United States Patent
Vinogradov et al.

(10) Patent No.: US 8,002,186 B2
(45) Date of Patent: Aug. 23, 2011

(54) LASER POWER CONTROL ARRANGEMENTS IN ELECTRO-OPTICAL READERS

(75) Inventors: Igor Vinogradov, Oakdale, NY (US); Mark Drzymala, Commack, NY (US); Darren Handshaw, Miller Place, NY (US); Yuly Mitelman, Stony Brook, NY (US); Rong Liu, Selden, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 360 days.

(21) Appl. No.: 12/288,803

(22) Filed: Oct. 23, 2008

(65) Prior Publication Data

US 2010/0102128 A1    Apr. 29, 2010

(51) Int. Cl.
*G06K 7/10* (2006.01)
(52) U.S. Cl. .............. 235/455; 235/472.01; 235/473; 235/483; 235/486
(58) Field of Classification Search ............ 235/455, 235/472.01, 473, 483, 486
See application file for complete search history.

(56) References Cited

U.S. PATENT DOCUMENTS

| 4,613,895 | A | 9/1986 | Burkey et al. |
| 4,794,239 | A | 12/1988 | Allais |
| 5,304,786 | A | 4/1994 | Pavlidis et al. |
| 5,663,980 | A * | 9/1997 | Adachi ................. 372/108 |
| 5,703,349 | A | 12/1997 | Meyerson et al. |
| 2008/0017717 | A1 * | 1/2008 | Miyazaki et al. ...... 235/472.01 |
| 2008/0078835 | A1 * | 4/2008 | Gurevich et al. ......... 235/455 |

FOREIGN PATENT DOCUMENTS

| EP | 0498366 | 8/1992 |
| WO | 2006060150 | 6/2006 |
| WO | 2008039963 | 4/2008 |
| WO | 2010047995 | 4/2010 |

OTHER PUBLICATIONS

International Search Report and Written Opinion dated Jan. 18, 2010 in related application PCT/US2009/060448.

* cited by examiner

*Primary Examiner* — Michael G Lee
*Assistant Examiner* — Kristy A Haupt

(57) ABSTRACT

A laser power control arrangement and method in an electro-optical reader for reading indicia includes an energizable laser for emitting a laser beam having an output power along a path. An internal light detector, e.g., a monitor photodiode, is mounted inside the laser for monitoring the output power of the laser. An external light detector, e.g., an auxiliary photodiode, is mounted outside the laser for monitoring the output power of the laser independently of the internal light detector. A guide, advantageously a light pipe or a diffuser, is positioned outside the laser in the path of the laser beam for guiding the laser beam from the laser to the external light detector. A controller is operatively connected to each light detector, for controlling a monitored output power of the laser beam by deenergizing the laser when the monitored output power of the laser beam exceeds a safe power level limit.

10 Claims, 5 Drawing Sheets

LASER POWER CONTROL ARRANGEMENTS IN ELECTRO-OPTICAL READERS

BACKGROUND OF THE INVENTION

Moving laser beam readers or laser scanners, as well as solid-state imaging systems or imaging readers, have both been used to electro-optically read one-dimensional bar code symbols, particularly of the Universal Product Code (UPC) type, each having a row of bars and spaces spaced apart along one direction, and two-dimensional symbols, such as Code 49, which introduced the concept of vertically stacking a plurality of rows of bar and space patterns in a single symbol, as described in U.S. Pat. No. 4,794,239. Another two-dimensional code structure for increasing the amount of data that can be represented or stored on a given amount of surface area is known as PDF417 and is described in U.S. Pat. No. 5,304,786.

Moving laser beam readers generally include a laser for emitting a laser beam, a focusing lens assembly for focusing the laser beam to form a beam spot having a certain size at a focal plane in a range of working distances, a scan component for repetitively scanning the beam spot across a target symbol in a scan pattern, for example, a scan line or a series of scan lines, across the target symbol multiple times per second, e.g., forty times per second, a photodetector for detecting laser light reflected and/or scattered from the symbol and for converting the detected laser light into an analog electrical signal, and signal processing circuitry including a digitizer for digitizing the analog signal, and a microprocessor for decoding the digitized signal based upon a specific symbology used for the symbol.

The imaging reader includes a solid-state imager or sensor having an array of cells or photosensors that correspond to image elements or pixels in a field of view of the imager, an aiming light assembly having an aiming light source, e.g., an aiming laser, and an aiming lens for generating an aiming light pattern or mark on a symbol prior to reading, an illuminating light assembly for illuminating the field of view with illumination light from an illumination light source, e.g., one or more light emitting diodes (LEDs), and an imaging lens assembly for capturing return ambient and/or illumination light scattered and/or reflected from the symbol being imaged over a range of working distances. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

As advantageous as both types of readers are in reading symbols, it is always desirable to enhance performance. Increasing the intensity or brightness of the laser beam of the laser in the moving laser beam reader will increase the working distance range, because there will be correspondingly more return light to detect from symbols that are further away from the moving laser beam reader. Similarly, increasing the intensity or brightness of the aiming laser in the imaging reader will increase performance, because the aiming pattern will be more visible to an operator, especially for symbols that are further away from the imaging reader.

However, increasing the laser beam intensity too much of either the laser in the moving beam reader or the aiming laser in the imaging reader may violate human eye exposure laser safety standard limits. For example, a class 2 laser is limited to an output power of 1 mW over a base time interval of 250 msec, and a class 1 laser is limited to an output power of 0.39 mW over a base time interval of 10 sec. The laser beam intensity cannot exceed these limits not only in normal operation, but also in the event of reader malfunction or failure of laser power control circuitry specifically provided in each reader to insure that these limits are never surpassed.

The known laser power control circuitry in such readers monitor the laser current in order to indirectly provide feedback about the output power of the laser beam. However, such indirect monitoring is not very accurate, consistent or efficient, and also changes over time. Also, there are applications where severe and tight mechanical and space constraints compromise the capability of such control circuitry to function reliably. Accordingly, there is a need for increased reliability, accuracy, consistency and efficiency of such laser power control circuitry in such readers that employ a laser, especially readers of compact size, to observe human eye exposure safety limit standards under all circumstances, especially in the event of malfunction of one or more components of the reader and/or failure of the laser power control circuitry.

SUMMARY OF THE INVENTION

One feature of the present invention resides, briefly stated, in a laser power control arrangement and method in an electro-optical reader for reading indicia, such as bar code symbols, which employs an energizable laser, preferably a laser diode, for emitting a laser beam having an output power along a path. In the case of a moving laser beam reader, the laser beam may be scanned across the indicia. In the case of an imaging reader, the laser may be an aiming laser for directing an aiming pattern at the indicia.

An internal light detector, e.g., a monitor photodiode, is mounted inside the laser, for monitoring the output power of the laser. An external light detector, e.g., an auxiliary photodiode, is mounted outside the laser, for monitoring the output power of the laser independently of the internal light detector. A controller is operatively connected to each light detector, for controlling a monitored output power of the laser beam by deenergizing the laser when the monitored output power of the laser beam exceeds a safe power level limit. Failure of the internal light detector is backed up by the redundant external light detector to insure that the human eye exposure laser safety standard limit is not violated.

In accordance with an aspect of this invention, a guide is positioned outside the laser in the path of the laser beam, for guiding at least a portion of the laser beam from the laser to the external light detector. The guide insures that a sufficient amount of the laser beam is reliably, consistently, accurately and efficiently guided to the external light detector. The guide is advantageously of compact dimensions to insure its inclusion even in readers with constrained space requirements. A focusing lens is advantageously positioned along the path downstream of the laser. The guide has a passage through which a major fraction of the laser beam passes along the path to be focused by the focusing lens.

In one embodiment, the guide includes a diffuser outside the passage for scattering a minor fraction of the laser beam as scattered laser light towards the external light detector in a direction predominantly transverse to the path. The diffuser may have a textured surface, or be integrated with scattering particles, for scattering the scattered laser light. In another embodiment, the guide includes a light pipe outside the passage for reflecting a minor fraction of the laser beam as reflected laser light, and for guiding at least a portion of the reflected laser light to the external light detector in a direction predominantly transverse to the path. The light pipe may have a total internal reflecting surface for reflecting the reflected laser light.

In either embodiment, the laser emits the laser beam with a light intensity distribution in a plane perpendicular to the path and characterized by an elliptical or oval cross-section, because the horizontal beam divergence is not equal to the vertical beam divergence. The oval cross-section has a generally circular, central zone and a pair of peripheral end zones at opposite ends of the central zone. The passage is generally circular. The major fraction of the laser beam occupies the central zone within the oval cross-section of the laser beam. The minor fraction of the laser beam occupies the end zones within the oval cross-section of the laser beam. In addition, a holder is operative for holding the guide and the focusing lens in a fixed position relative to each other. An aperture stop is preferably formed integrally with the holder and, together with the focusing lens, collimates the laser beam.

The method is performed by emitting a laser beam having an output power along a path by energizing a laser, monitoring the output power of the laser by mounting an internal light detector inside the laser, monitoring the output power of the laser independently of the internal light detector by mounting an external light detector outside the laser, guiding the laser beam from the laser to the external light detector by positioning a guide outside the laser in the path of the laser beam, and controlling a monitored output power of the laser beam by deenergizing the laser when the monitored output power of the laser beam exceeds a safe power level limit.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

As used herein, the term "indicia" broadly encompasses not only symbol patterns composed of alternating bars and spaces of various widths as commonly referred to as bar code symbols, but also other one- or two-dimensional graphic patterns, as well as alphanumeric characters. In general, the term "indicia" may apply to any type of pattern or characters, which may be recognized or identified either by scanning a light beam and detecting reflected or scattered light as a representation of variations in light reflectivity at various points of the pattern or characters, or by capturing ambient and/or illumination light from the pattern or characters to form an image to be decoded.

Figure 1:
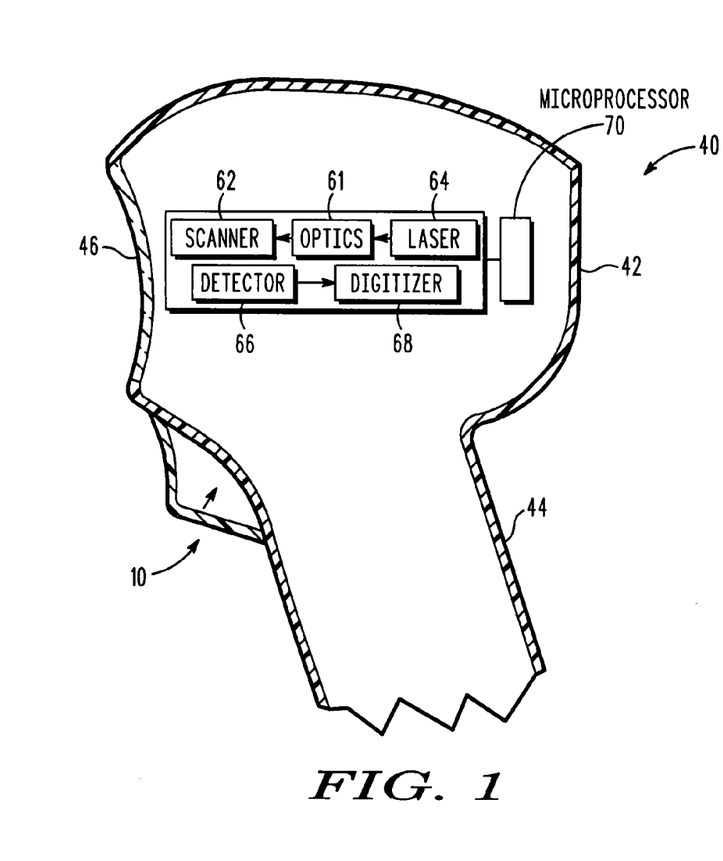
FIG. 1 is a schematic diagram of a handheld moving laser beam reader for electro-optically reading indicia in accordance with the present invention.

FIG. 1 depicts a moving laser beam reader 40 for electro-optically reading a target or indicia, such as a symbol, that may use, and benefit from, the present invention. The beam reader 40 includes a scanner 62 in a handheld housing 42 having a handle 44 on which a trigger 10 for initiating reading is mounted. The scanner 62 is operative for scanning an outgoing laser beam from a laser 64 and/or a field of view of a light detector or photodiode 66 in a scan pattern, typically comprised of one or more scan lines, multiple times per second, for example, forty times per second, through a window 46 across the symbol for reflection or scattering therefrom as return light detected by the photodiode 66 during reading. The beam reader 40 also includes a focusing lens assembly or optics 61 for optically modifying the outgoing laser beam to have a large depth of field, and a digitizer 68 for converting an electrical analog signal generated by the detector 66 from the return light into a digital signal for subsequent decoding by a microprocessor or controller 70 into data indicative of the symbol being read.

Figure 2:
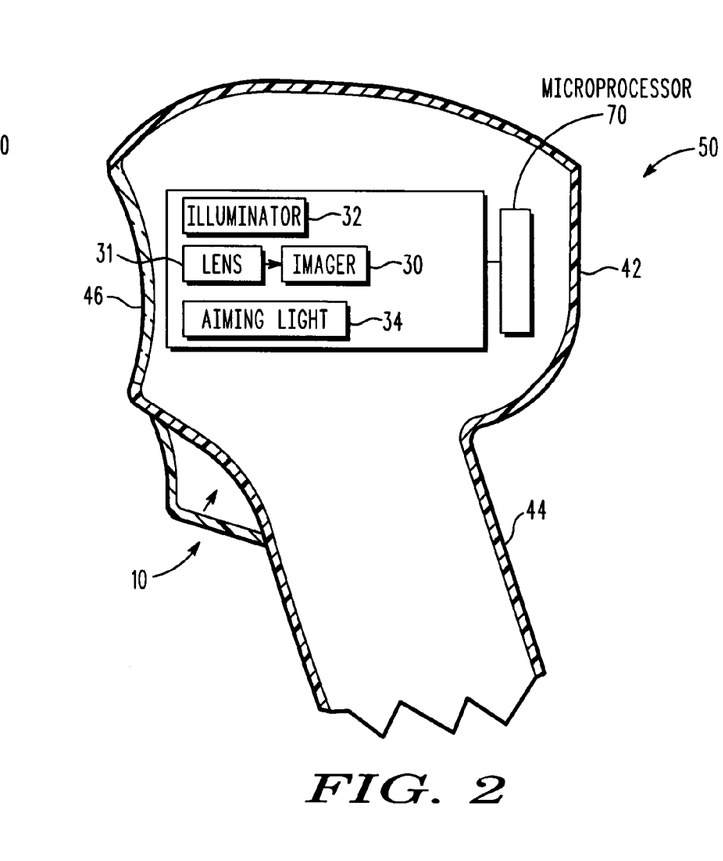
FIG. 2 is a schematic diagram of a handheld imaging reader for electro-optically reading indicia in accordance with the present invention.

FIG. 2 depicts an imaging reader 50 for imaging targets, such as indicia or symbols to be electro-optically read, as well as non-symbols, which may use, and benefit from, the present invention. The imaging reader 50 includes a one- or two-dimensional, solid-state imager 30, preferably a CCD or a CMOS array, mounted in the handheld housing 42 having the handle 44 on which the trigger 10 for initiating reading is mounted. The imager 30 has an array of image sensors operative, together with an imaging lens assembly 31, for capturing return light reflected and/or scattered from the target through the window 46 during the imaging to produce an electrical signal indicative of a captured image for subsequent decoding by the controller 70 into data indicative of the symbol being read, or into a picture of the target.

When the reader 50 is operated in low light or dark ambient environments, the imaging reader 50 includes an illuminator 32 for illuminating the target during the imaging with illumination light directed from an illumination light source through the window 46. Thus, the return light may be derived from the illumination light and/or ambient light. The illumination light source comprises one or more light emitting diodes (LEDs). An aiming light generator 34 including an aiming laser may also be provided for projecting an aiming light pattern or mark on the target prior to imaging.

In operation of the imaging reader 50, the controller 70 sends command signals to drive the aiming laser 34 to project the aiming pattern on the target prior to reading, and then to drive the illuminator LEDs 32 for a short time period, say 500 microseconds or less, and to energize the imager 30 during an exposure time period of a frame to collect light from the target during said time period. A typical array needs about 33 milliseconds to read the entire target image and operates at a frame rate of about 30 frames per second. The array may have on the order of one million addressable image sensors.

Figure 3:
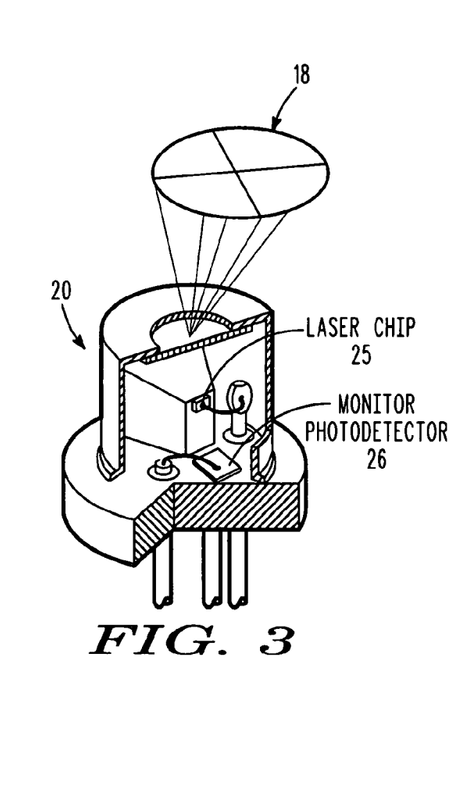
FIG. 3 is a broken-away, perspective view of a laser for use in the readers of FIG. 1 or 2 in accordance with the present invention.

The laser 62, as shown in FIG. 1, or the aiming laser 34, as shown in FIG. 2, is depicted in isolation in FIG. 3 as a packaged semiconductor laser 20 that includes a laser chip or diode 25 for emitting a laser beam having an output power along a path, and an internal monitor detector or photodiode 26 operative for monitoring the output power of the laser beam of the diode 25. FIG. 3 also shows that the emitted laser beam has a light intensity distribution in a plane perpendicular to the path characterized by an elongated, elliptical, or oval cross-section 18, because the horizontal beam divergence is not equal to the vertical beam divergence.

Figure 4:
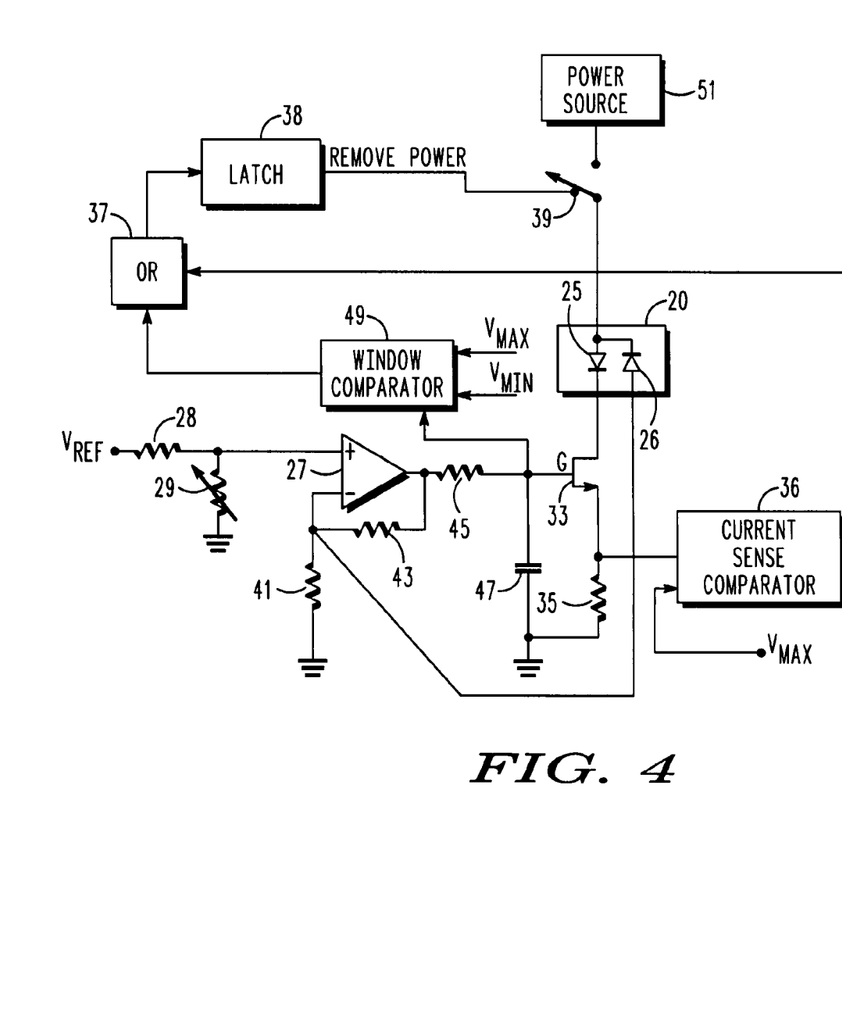
FIG. 4 is a circuit schematic view of one aspect of a laser power control arrangement in accordance with the present invention.

As shown in the circuit of FIG. 4, the monitor photodiode 26 of the laser 20 is operative for monitoring the output power of the diode 25, and is part of a feedback circuit operative for maintaining the laser output power constant. The feedback circuit includes a comparator 27 having a reference voltage applied to a positive input of the comparator through a voltage divider comprised of resistors 28, 29. The monitor photodiode 26 is connected to a negative input of the comparator via a resistive network including resistors 41, 43. The output of the comparator 27 is conducted through a resistor 45 and capacitor 47 to a gate G of a field effect transistor (FET) 33. The drain output of the FET 33 is connected to the laser diode 25. The source output of the device 33 is connected to ground through a current sense resistor 35.

The circuit of FIG. 4 is conventional in that the monitor photodiode 26 detects changes in output power of the laser beam emitted by laser diode 25 and sends a feedback signal to the comparator 27 for driving the FET 33 to allow more or less current to pass through the current sense resistor 35 and, in turn, through the laser diode 25. The greater this current, the greater the laser output power, and vice versa.

A current sense comparator 36 has one input connected to the current sense resistor 35 to monitor the current flowing therethrough, and another input connected to a reference voltage that corresponds to the maximum current allowable through the resistor 35. The output of the comparator 36 is connected to an OR gate 37 which, in turn, is connected to a latch 38 and a switch 39, which is connected between a power supply 51 and the laser diode 25. If the comparator 36 senses that the current passing through the resistor 35 exceeds a maximum preestablished value, then an output control signal is conducted to the gate 37 and, in turn, to the latch 38 for opening the switch 39 to remove the power source 51 from energizing the laser diode 25.

In further accordance with FIG. 4, a window comparator 49 is connected to the resistor 45 and monitors the voltage being applied to the gate G of the FET 33. A maximum gate voltage and a minimum gate voltage are also applied to the window comparator 49, preferably under the control of the controller 70. The comparator 49 is, in turn, connected to the OR gate 37. If the comparator 49 senses that the gate voltage being applied to the gate G is greater than the preestablished maximum gate voltage, or is less than the preestablished minimum gate voltage, then a signal is sent to the OR gate 37 to operate the latch 38 and open the switch 39, thereby deenergizing the laser diode. Thus, power is removed from the laser diode 25 in the event of malfunction or failure of the monitor photodiode 26, the FET 33, the comparator 27, the laser diode 25, or any circuit connection.

More specifically, the FIG. 4 circuit removes the power source 51 from the laser 20 after detecting an out-of-range condition in the error amplifier 27 that controls the output power of the laser 25. This circuit will remove power from the laser under the following conditions: A failure of the FET 33 in the output of the laser drive causes excess current to flow through the laser, thereby causing the laser output to exceed the factory set limit. The monitor diode 26 connection is lost due to a FET 33 failure or a circuit connection failure. The laser 25 fails and the laser drive current significantly increases as resistor 35 is used to sense a high current drive condition.

Figure 5:
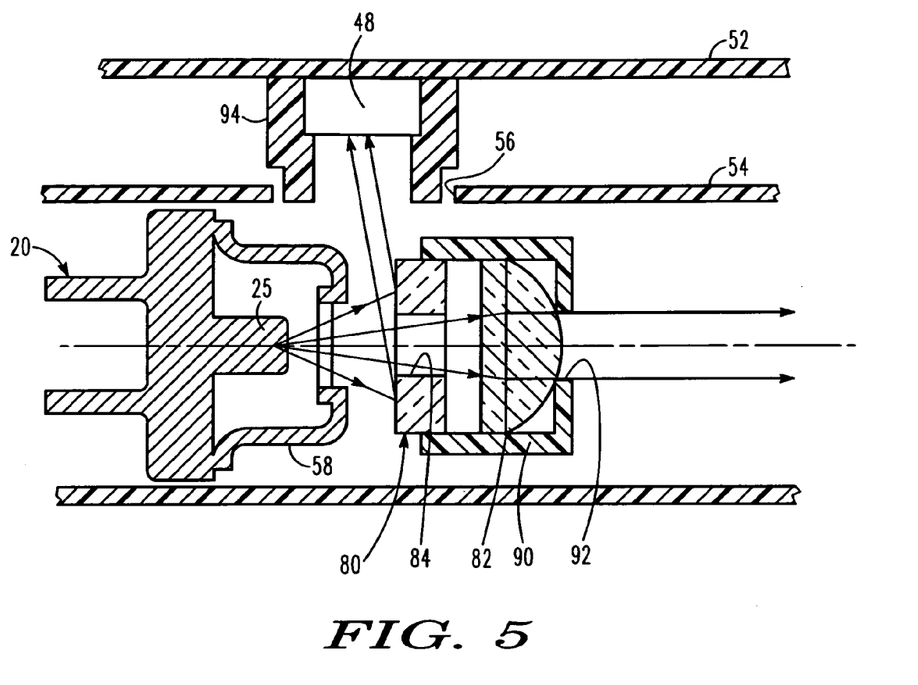
FIG. 5 is a sectional view of another aspect of a laser power control arrangement in accordance with one embodiment of the present invention.
Figure 6:
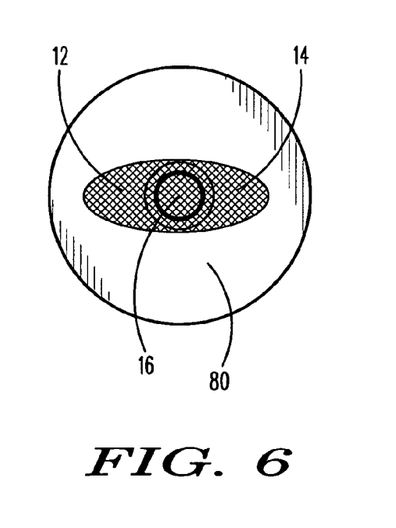
FIG. 6 is an enlarged end view of a detail of the embodiment of FIG. 5.
Figure 7:
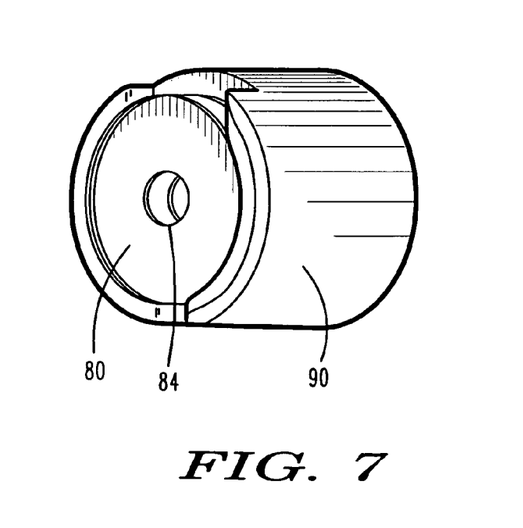
FIG. 7 is an enlarged perspective view of a detail of the embodiment of FIG. 5.
Figure 8:
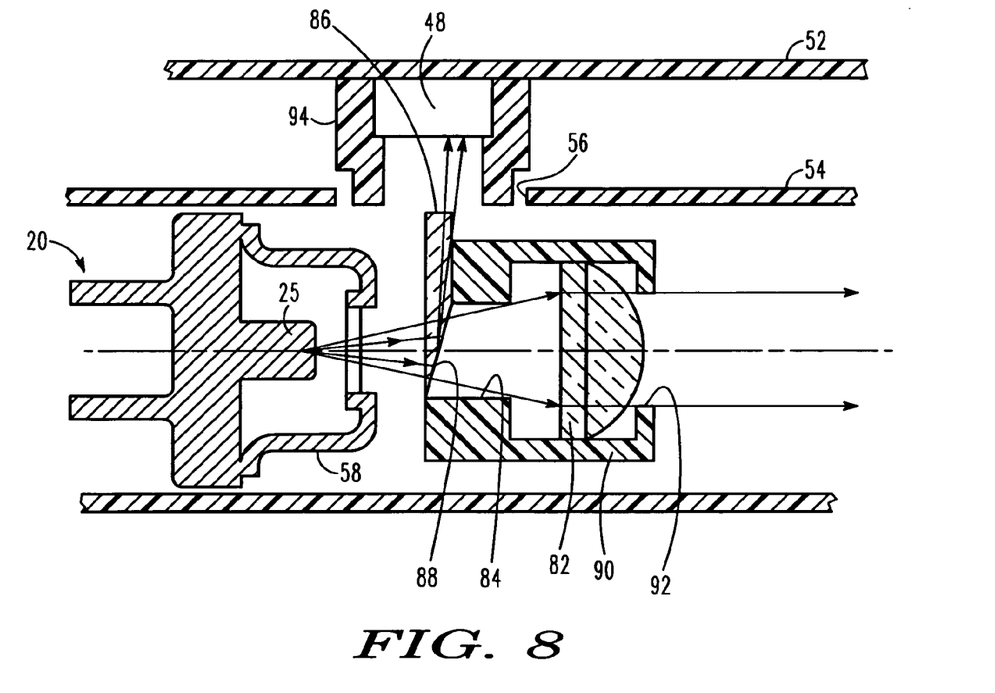
FIG. 8 is a sectional view of another aspect of a laser power control arrangement in accordance with another embodiment of the present invention.
Figure 9:
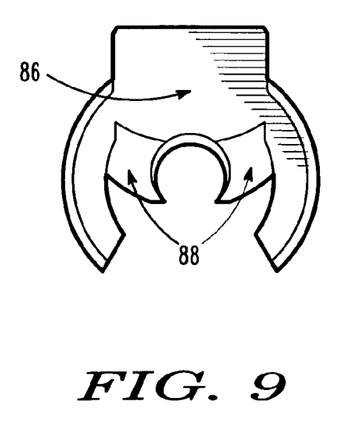
FIG. 9 is an enlarged end view of a detail of the embodiment of FIG. 8.
Figure 10:
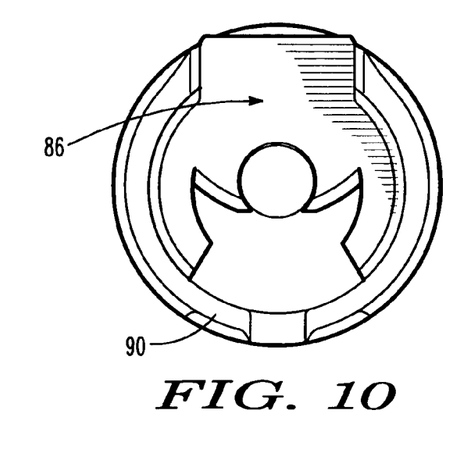
FIG. 10 is an enlarged opposite end view of a detail of the embodiment of FIG. 8.
Figure 11:
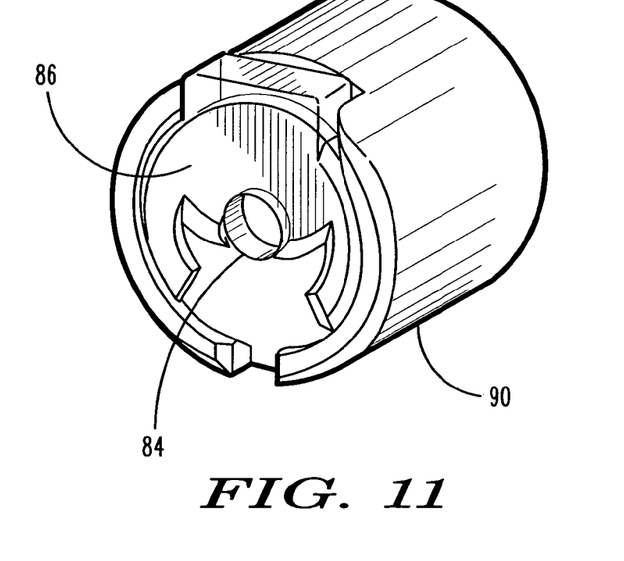
FIG. 11 is an enlarged perspective view of a detail of the embodiment of FIG. 8.

In case of failure by the monitor diode 26 and its feedback circuitry, other redundant arrangements for removing power from the laser 20 are depicted in the embodiment of FIGS. 5-7 and in the embodiment of FIGS. 8-11. In each figure, the monitor photodiode 26 is not shown so as not to encumber the drawings. Instead, an external light detector or redundant auxiliary photodiode 48 is mounted outside of the laser 20. Specifically, the redundant auxiliary photodiode 48 is surface-mounted on a printed circuit board (PCB) 52 spaced away from a chassis 54 having a hole 56. The laser diode 25 is mounted on the chassis 54.

In accordance with an aspect of this invention, a guide 80, as shown in FIG. 5, is positioned outside the laser 20 in the path of the laser beam, for guiding at least a portion of the laser beam from the laser 20 to the external light detector 48. The guide 80 insures that a sufficient amount of the laser beam is reliably, consistently, accurately and efficiently guided to the external light detector 48. The guide 80 is advantageously of compact dimensions, e.g., 0.3 mm to 2.0 mm in thickness, to insure its inclusion even in readers with constrained space requirements.

A focusing lens 82 is advantageously positioned along the path downstream of the laser 20. The guide 80 has a passage 84 through which a major fraction of the laser beam passes along the path to be focused by the focusing lens 82. In addition, a holder 90, as shown in FIG. 7, is operative for holding the guide 80 and the focusing lens 82 in a fixed position relative to each other. An aperture stop 92 is preferably formed integrally with the holder 90 and, together with the focusing lens 82, collimates the laser beam.

In the embodiment of FIGS. 5-7, the guide 80 includes a diffuser outside the passage 84 for scattering a minor fraction of the laser beam as scattered laser light through the hole 56 to the external light detector 48 in a direction predominantly transverse to the path. The diffuser may have a textured or diffractive surface on either of its major surfaces, or be integrated with scattering particles, for scattering the scattered laser light. In the embodiment of FIGS. 8-11, the guide includes a light pipe 86 outside the passage 84 for reflecting a minor fraction of the laser beam as reflected laser light, and for guiding at least a portion of the reflected laser light through the hole 56 to the external light detector 48 in a direction predominantly transverse to the path. The light pipe 86 may have a total internal reflecting surface 88 for reflecting the reflected laser light. The angle of the total internal reflecting surface 88 relative to the path is larger than the critical angle, so that the incident minor fraction of the laser beam is reflected along a folded path to the external light detector 48. In a variant construction, rather than providing a total internal reflecting surface, a surface of the light pipe may be coated with a reflective coating, such as gold or any metal, or a multilayer dialectic coating, to reflect the incident minor fraction of the laser beam.

In either embodiment, the laser 25 emits the laser beam with the oval cross-section 18. As shown in FIG. 6, the oval cross-section 18 occupies a generally circular, central zone 16 and a pair of peripheral end zones 12, 14 at opposite ends of the central zone 16. The passage 84 is generally circular. The major fraction of the laser beam occupies the central zone 16 within the oval cross-section 18 of the laser beam and passes unobstructed through the passage 84 to the focusing lens 82 and the aperture stop 92, for focusing and collimating the laser beam for use as a scanning laser beam in a moving laser beam reader, or as an aiming laser pattern in an imaging reader.

The minor fraction of the laser beam occupies the end zones 12, 14 within the oval cross-section 18 of the laser beam, and it is this minor fraction of the laser beam that is scattered by the diffuser 80, or reflected by the total internal reflecting surface 88 or coated surface of the light pipe 86. This minor fraction of the laser beam passes through the hole 56 located in the region between the laser diode 20 and the holder 90 and is detected by the redundant auxiliary photodiode 48 and serves as a reliable measure of the output power of the laser beam. A rubber boot 94 surrounds the redundant auxiliary photodiode 48 and serves as an enclosure to prevent stray ambient light from being detected by the photodiode 48. The rubber boot 94 has an opening to enable the guided light to reach the photodiode 48.

The light detected by either the auxiliary photodiode 48, or the monitor photodiode 26, is monitored and converted by the controller 70 to generate a control signal used to open the switch 39 when the monitored operating power exceeds a preestablished safe power level limit. This feature promotes safety in the use of a reader in which a laser beam is generated.

It will be understood that each of the elements described above, or two or more together, also may find a useful application in other types of constructions differing from the types described above. For example, in another variant, the total internal reflecting surface or coated surface described above in connection with the light pipe 86 can be directly incorporated into the holder 90. In this variant, the light pipe is unnecessary.

While the invention has been illustrated and described as embodied in laser power control arrangements in electro-optical readers, it is not intended to be limited to the details shown, since various modifications and structural changes may be made without departing in any way from the spirit of the present invention. Although described in connection with readers, the laser control arrangements of this invention can equally well be applied to laser projection displays and, in general, any system in which a laser is used.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A laser power control arrangement in an electro-optical reader for reading indicia, comprising:
    an energizable laser for emitting a laser beam having an output power along a path;
    an internal light detector inside the laser, for monitoring the output power of the laser;
    an external light detector outside the laser, for monitoring the output power of the laser independently of the internal light detector;
    a guide positioned outside the laser in the path of the laser beam, for guiding the laser beam from the laser to the external light detector;
    a controller operatively connected to each light detector, for controlling a monitored output power of the laser beam by deenergizing the laser when the monitored output power of the laser beam exceeds a safe power level limit; and
    a focusing lens positioned along the path downstream of the laser, wherein the guide has a passage through which a major fraction of the laser beam passes along the path to be focused by the focusing lens, and wherein the guide includes a light pipe outside the passage for reflecting a minor fraction of the laser beam as reflected laser light, and for guiding the reflected laser light to the external light detector in a direction transverse to the path.

2. The arrangement of claim 1, wherein the laser is a laser diode, wherein the internal light detector is a monitor photodiode, and wherein the external light detector is an auxiliary photodiode.

3. The arrangement of claim 1, wherein the laser emits the laser beam with an oval cross-section having a generally circular, central zone and a pair of end zones at opposite ends of the central zone, wherein the passage is generally circular, wherein the major fraction of the laser beam occupies the central zone within the oval cross-section of the laser beam, and wherein the minor fraction of the laser beam occupies the end zones within the oval cross-section of the laser beam.

4. The arrangement of claim 1, and a focusing lens positioned along the path downstream of the laser, and a holder for holding the guide and the focusing lens in a fixed position relative to each other.

5. The arrangement of claim 4, and an aperture stop integral with the holder.

6. A laser power control method in an electro-optical reader for reading indicia, comprising the steps of:
    emitting a laser beam having an output power along a path by energizing a laser;
    monitoring the output power of the laser by mounting an internal light detector inside the laser;
    monitoring the output power of the laser independently of the internal light detector by mounting an external light detector outside the laser;
    guiding the laser beam from the laser to the external light detector by positioning a guide outside the laser in the path of the laser beam;
    controlling a monitored output power of the laser beam by deenergizing the laser when the monitored output power of the laser beam exceeds a safe power level limit; and
    positioning a focusing lens along the path downstream of the laser, and configuring the guide with a passage through which a major fraction of the laser beam passes along the path to be focused by the focusing lens, and configuring the guide with a light pipe outside the passage for reflecting a minor fraction of the laser beam as reflected laser light, and for guiding the reflected laser light to the external light detector in a direction transverse to the path.

7. The method of claim 6, and configuring the laser as a laser diode, and configuring the internal light detector as a monitor photodiode, and configuring the external light detector as an auxiliary photodiode.

8. The method of claim 6, and configuring the laser to emit the laser beam with an oval cross-section having a generally circular, central zone and a pair of end zones at opposite ends of the central zone, and configuring the passage to be generally circular, and configuring the major fraction of the laser beam to occupy the central zone within the oval cross-section of the laser beam, and configuring the minor fraction of the laser beam to occupy the end zones within the oval cross-section of the laser beam.

9. The method of claim 6, and positioning a focusing lens along the path downstream of the laser, and holding the guide and the focusing lens in a fixed position relative to each other on a holder.

10. The method of claim 9, and integrating an aperture stop with the holder.

* * * * *

UNITED STATES PATENT AND TRADEMARK OFFICE
CERTIFICATE OF CORRECTION

| | | |
|---|---|---|
| PATENT NO. | : 8,002,186 B2 | Page 1 of 1 |
| APPLICATION NO. | : 12/288803 | |
| DATED | : August 23, 2011 | |
| INVENTOR(S) | : Igor Vinogradov et al. | |

It is certified that error appears in the above-identified patent and that said Letters Patent is hereby corrected as shown below:

Title page item (75), spelling of first name of inventor 3 should read Darran and not Darren as currently quoted in the issued patent.

Signed and Sealed this
Eleventh Day of October, 2011

David J. Kappos
*Director of the United States Patent and Trademark Office*